(No Model.)

J. SCHALLER.
ICE CREAM FREEZER.

No. 518,280. Patented Apr. 17, 1894.

Witnesses:
E. R. Bolton
H. Van Oldenneel

Inventor:
Jules Schaller
By Richards & Geo.
his Attorneys.

THE NATIONAL LITHOGRAPHING COMPANY,
WASHINGTON, D. C.

UNITED STATES PATENT OFFICE.

JULES SCHALLER, OF PARIS, FRANCE.

ICE-CREAM FREEZER.

SPECIFICATION forming part of Letters Patent No. 518,280, dated April 17, 1894.

Application filed October 7, 1893. Serial No. 487,448. (No model.)

*To all whom it may concern:*

Be it known that I, JULES SCHALLER, a citizen of the French Republic, residing at Paris, in the Department of the Seine, France, have invented certain new and useful Improvements in Ice-Making Machines, of which the following is a specification.

It is the object of my invention to provide a simple portable form of freezer for cream or water having inlet openings through which the freezing mixture may readily be introduced without removing the cream or water vessel and having provision also for draining off the waste or expended mixture so that it may be renewed.

My apparatus includes a special arrangement of beaters or agitators by which the refrigerating mixture may be kept active to accelerate the freezing process.

Figure 1:
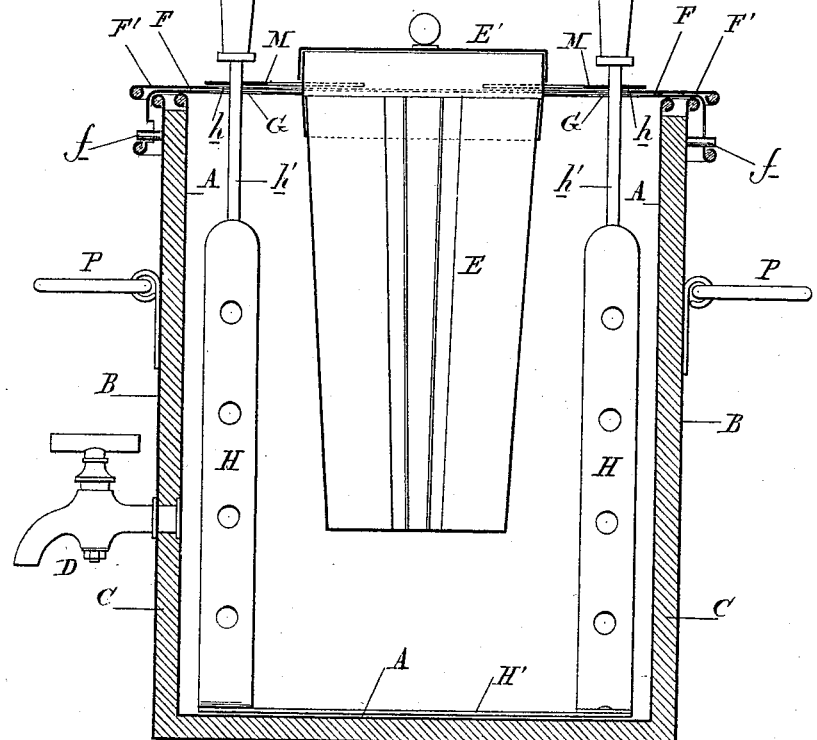
Figure 2:
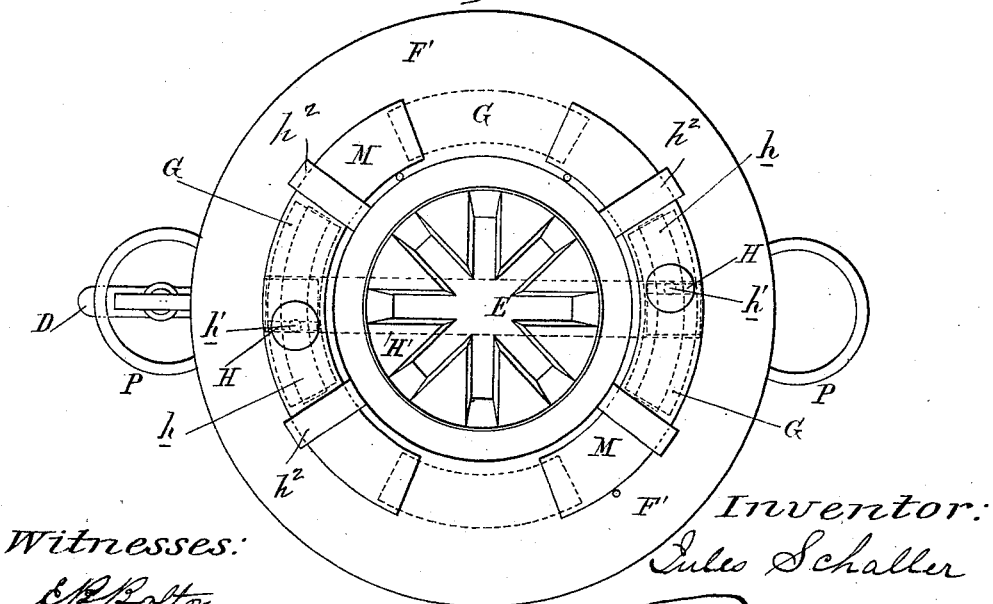

In the drawings Figure 1, represents a sectional view and Fig. 2, a plan view of my invention.

The apparatus consists of two cylindrical casings A B made of suitable material but preferably of metal which fit the one into the other. The interior recipient A is smaller in diameter than the exterior casing B and the empty space between the two casings is filled by some material C that is a bad conductor of heat, as for instance coal dust, felt or other material. A cock D is arranged at the lower part of the receptacle in order to permit the withdrawal of the refrigerating material when the salt has melted. The operator may add salt and water through openings at G at the upper part which openings are made in the plate F. This construction enables the user to add refrigerating mixture or to renew the same without exposing the different parts of the freezer to the action of the outside air and without requiring manipulations that would be likely to cause the salt or the water to run into the water or the cream it is desired to freeze. The cream vessel E projects about two centimeters above the plate F' and is provided with a cover E' and said vessel is formed integral with the cover plate F of the outer receptacle underneath which the mixture is prepared and kept.

In order to stir the refrigerating mixture I make use of a system of beaters H preferably provided with handles the rods $h'$ of the beaters passing through the openings G and through channels $h$ of a second plate F', which channels are covered by covers M guided by the bands $h^2$ which covers move with the rods $h'$ of the beaters. The beaters are connected at their lower ends by a cross piece H' that serves to stir the mixture that is at the bottom. The plate F is held in position by means of a bayonet joint at $f$ upon the exterior part of the casing B, which can moreover be provided with handles P in order that the apparatus may be carried. The plate F' affords a bearing on which the covers M may move.

I claim—

1. A freezer comprising the outer receptacle, the holding vessel E formed with a cover plate F for the receptacle, said plate having openings for the introduction of the freezing mixture and the beaters passing down through the cover plate into the outer receptacle, substantially as described.

2. A freezer comprising the outer receptacle, the vessel E depending therein and a cover plate F having openings to receive the freezing mixture the beaters passing down through the openings in the cover plate, the sliding covers M carried by the beater stems and the cock D leading from the lower end of the receptacle, substantially as described.

3. In combination, the outer receptacle, the inner containing vessel, the cover plate F having openings to receive the freezing mixture, and the second plate F', substantially as described.

4. In combination the outer receptacle, the inner containing vessel, the cover plate F having openings to receive the freezing mixture, the second plate F', the beaters depending into the annular space between the inner and outer receptacles, and extending up through the plates F F', and the cover plates M moving with the beaters, substantially as described.

In witness whereof I have hereunto set my hand in presence of two witnesses.

JULES SCHALLER.

Witnesses:
CLYDE SHROPSHIRE,
JULES FAYOLLET.